United States Patent [19]

Chao

[11] Patent Number: 5,309,485
[45] Date of Patent: May 3, 1994

[54] CORE AUTOMATED MONITORING SYSTEM

[75] Inventor: Fred Chia-Chi Chao, Saratoga, Calif.

[73] Assignee: General Electric Company, San Jose, Calif.

[21] Appl. No.: 909,343

[22] Filed: Jul. 6, 1992

[51] Int. Cl.$^5$ .............................................. G21C 7/36
[52] U.S. Cl. .................................. 376/215; 376/217; 376/255
[58] Field of Search ............... 376/215, 216, 217, 254, 376/255

[56] References Cited

U.S. PATENT DOCUMENTS

| | | | |
|---|---|---|---|
| 4,678,622 | 7/1987 | Rowe et al. | 376/259 |
| 4,997,617 | 3/1991 | Newton et al. | 376/216 |
| 5,009,833 | 4/1991 | Takeuchi et al. | 376/217 |
| 5,118,461 | 6/1992 | Fujii | 376/215 |
| 5,169,592 | 12/1992 | Mourlevat et al. | 376/215 |

OTHER PUBLICATIONS

General Electric Company "BWR/6 General Description of a Boiling Water Reactor," Sep. 1980, pp. i, ii, 1-1 to 1-6, 3-10 to 3-18, and 6-1, to 6-15, publication-restricted document.

Primary Examiner—Donald P. Walsh
Assistant Examiner—Frederick H. Voss
Attorney, Agent, or Firm—J. S. Beulick

[57] ABSTRACT

An automated monitoring system and method of operation is provided for a nuclear reactor having a pressure vessel containing a reactor core for boiling water to generate steam. A plurality of monitors provide signals for respective monitoring parameters for monitoring operation of the reactor, and a computer includes a database therein containing predetermined setpoints for the monitoring parameters. The computer identifies abnormal and normal behavior of the monitoring parameters based on the database, and determines cause of abnormal behavior of the monitoring parameters using artificial intelligence. A warning i also provided to identify the cause of the monitoring parameter abnormal behavior. And, automatic mitigation action may also be effected.

11 Claims, 4 Drawing Sheets

CORE AUTOMATED MONITORING SYSTEM

The present invention relates generally to nuclear reactors, and, more specifically, to a system for monitoring performance of the reactor core for determining cause of abnormal behavior.

BACKGROUND OF THE INVENTION

A conventional boiling water reactor (BWR) includes a pressure vessel containing a reactor core for boiling water to generate steam for powering a steam turbine-generator for generating electrical power, for example. The BWR includes several conventional closed-loop control systems which control various individual operations of the BWR in response to demands.

For example, a conventional recirculation flow control system (RFCS) is used to control core flowrate which in turn controls output power of the reactor core. A conventional control rod drive system, i.e. rod control system (RCS), controls the control rod position and thereby control rod density within the reactor core for controlling reactivity therein. A conventional feedwater control system controls the feedwater supplied to the pressure vessel including its flowrate, and thereby water level within the pressure vessel, and the feedwater temperature is also controlled. And a conventional turbine control controls steam flow from the BWR to the turbine based on load demands and pressure regulation. All of these systems as well as other conventional systems utilize various monitoring parameters of the BWR for controlling operation thereof. Exemplary conventional monitoring parameters include core flow or flowrate effected by the RFCS, core pressure which is the pressure of the steam discharged from the pressure vessel to the turbine, neutron flux, feedwater temperature and flowrate, steam flow or flowrate provided to the turbine, core power, and various status indications of the BWR systems. Many of the monitoring parameters include conventional monitors or sensors for directly measuring the monitored parameter, whereas other monitoring parameters such as core power for example, are conventionally calculated using other monitoring parameters, and the status monitoring parameters are provided as output signals from the respective systems.

Conventional control parameters which include several of the monitoring parameters listed above are conventionally used for controlling operation of the BWR. The control parameters include, for example, core flow which controls reactor output power, control rod position which controls reactivity in the core, and feedwater flow and temperature which control water level within the pressure vessel and subcooling of the water contained therein, respectively. The several control systems conventionally control operation of the reactor in response to given demand signals such as load demand, for example. A computer program is conventionally used to analyze thermal and hydraulic characteristics of the reactor core for the control thereof. The analysis is based on nuclear data selected from analytical and empirical transient and accident events, and from conventional reactor physics and thermal-hydraulic principles. For example, core response to core flow changes in a BWR is related to conventionally known temperature, Doppler, Void, and power coefficients of reactivity, which reflect the conventional reactor physics and thermal-hydraulic principles.

However, in the event of an abnormal transient event, the operator on duty in the control room is required to manually react to the event at the very moment of the event based on his training, experience, and judgment. The remedial action taken may or may not be correct depending on the training and knowledge of the operator, and, in the latter event, an unnecessary reactor scram may be required. Furthermore, some transient events may occur exceptionally fast, and faster than the capability of a human operator to react thereto. In such an event, a reactor scram may be automatically effected.

One of the conventional reactor control systems is the nuclear system protection system (NSPS) which is a multi-channel electrical alarm and actuating system which monitors operation of the reactor, and upon sensing an abnormal event initiates action to prevent an unsafe or potentially unsafe condition. The NSPS conventionally provides three functions: (1) reactor trip which shuts down the reactor when certain monitored parameter limits are exceeded; (2) nuclear system isolation which isolates the reactor vessel and all connections penetrating the containment barrier; and (3) engineered safety feature actuation which actuates conventional emergency systems such as cooling systems and residual heat removal systems, for example.

Unless the operator promptly and properly identifies the cause of an abnormal transient event in the operation of the reactor, and promptly effects remedial or mitigating action, the nuclear system protection system will automatically effect reactor trip which is undesirable if not required.

OBJECTS OF THE INVENTION

Accordingly, one object of the present invention is to provide a new and improved monitoring system for a nuclear reactor.

Another object of the present invention is to provide a reactor monitoring system which automatically determines possible causes of an abnormal reactor condition.

Another object of the present invention is to provide an automated reactor monitoring system using artificial intelligence to identify the cause of reactor abnormal operation and provide a diagnosis message to the reactor operator.

Another object of the present invention is to provide an automated reactor monitoring system which is independent of the nuclear system protection system and is effective for mitigating the reactor abnormal condition.

SUMMARY OF THE INVENTION

An automated monitoring system and method of operation is provided for a nuclear reactor having a pressure vessel containing a reactor core for boiling water to generate steam. A plurality of monitors provide signals for respective monitoring parameters for monitoring operation of the reactor, and a computer includes a database therein containing predetermined setpoints for the monitoring parameters. The computer also includes means for identifying abnormal and normal behavior of the monitoring parameters based on the database, and means for determining cause of abnormal behavior of the monitoring parameters using artificial intelligence. Warning means are also provided to identify the cause of the monitoring parameter abnormal behavior. And, automatic mitigation action may also be effected.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
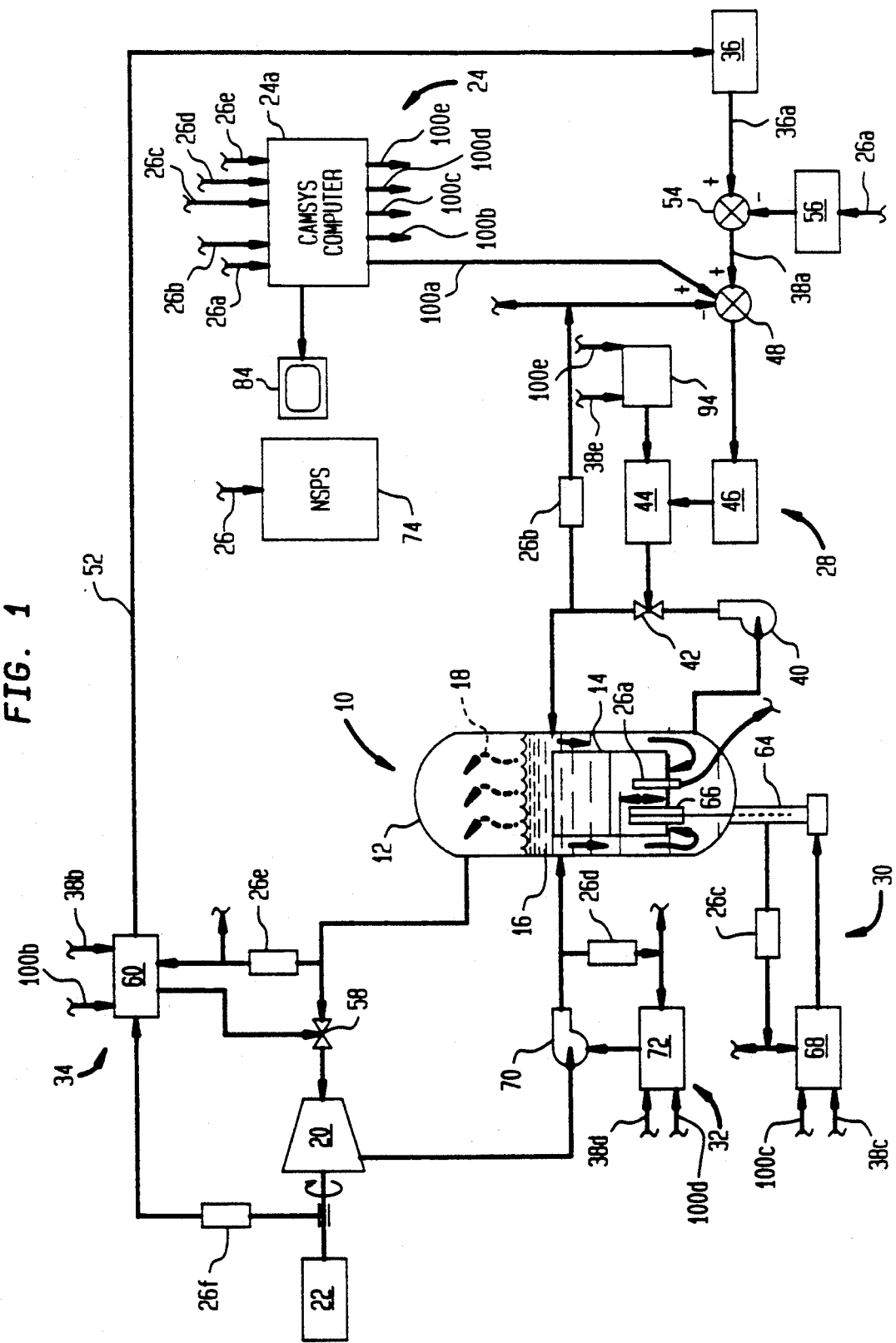
FIG. 1 is a schematic representation of a core automated monitoring system (CAMSYS) for a nuclear reactor in accordance with one embodiment of the present invention.

Illustrated schematically in FIG. 1 is an exemplary nuclear reactor 10 including a reactor pressure vessel 12 containing a nuclear reactor core 14 which in this exemplary embodiment is effective for boiling water 16 to generate steam 18. The boiling water reactor (BWR) 10 is used in this exemplary embodiment for providing the steam 18 to a conventional steam turbine 20 which rotates a conventional electrical generator 22 for providing electrical power to a conventional electrical utility grid.

In accordance with the present invention, a core automated monitoring system (CAMSYS) indicated generally at 24 is provided in conjunction with the reactor 10 for automatically monitoring the operation thereof to identify normal and abnormal operation and predict or identify the cause of abnormal transient events, and then provide a diagnosis thereof for evaluation by a human operator so that the operator may take corrective mitigative action, or such action may be taken automatically by the CAMSYS 24.

The CAMSYS 24 further includes a plurality of conventional sensors or monitors indicated collectively by the numeral 26 which provide input signals thereto. The monitors 26 are conventionally operatively joined to the reactor 10 and its various control systems for monitoring operation of the reactor 10 including its core 14, with each monitor 26 providing a corresponding electrical signal for a respective monitoring parameter designated MP. Exemplary monitoring parameters MP include:

neutron flux $MP_1$ provided by a conventional neutron flux monitor 26a in the reactor core 14 and operatively joined to the CAMSYS 24;

core flowrate $MP_2$ provided by a conventional core flowrate monitor 26b found in a conventional recirculation flow control system (RFCS) 28;

control rod density $MP_3$ provided by conventional position monitors 26c, conventionally found in a conventional rod control system (RCS) 30;

feedwater temperature $MP_4$ and flowrate $MP_5$ provided by conventional temperature and flowrate monitors, both monitors indicated schematically by the single box labeled 26d, in a conventional feedwater system 32 which separately controls feedwater flowrate and temperature; and reactor pressure $MP_6$ provided by a conventional pressure sensor 26e in a conventional pressure regulated turbine control system 34 operatively joined to the pressure vessel 12.

Additional, exemplary, conventional monitoring parameters include core thermal power, steam flow, reactor vessel water level, status of the several control systems such as the RFCS 28, the RCS system 30, the feedwater system 32, and the turbine control system 34.

These exemplary monitors, indicated generally by the numeral 26, are conventionally operatively joined through electrical lines to their respective control systems which conventionally receive suitable demand signals 38 from the plant control room. More specifically, the RFCS 28 is conventionally used in a boiling water reactor to control output power therefrom. The RFCS 28 includes a conventional recirculation pump 40 operatively joined to the pressure vessel 12 for receiving a portion of the water 16 therein, which water 16 is pumped to a conventional control valve 42 and back into the pressure vessel 12 for providing forced recirculation flow therein as is conventionally known. A conventional positioner or actuator 44 controls the position of the valve 42, and therefore the flowrate therethrough, in response to a conventional flow controller 46 operatively joined thereto. A conventional summer 48 receives a flow demand signal 38a and subtracts the monitored core flowrate signal $MP_2$ (26b) in a conventional closed, feedback loop for automatically maintaining the desired value of core flowrate $MP_2$ (26b). A conventional load demand error signal 52 is provided by the turbine control 34 to a load, or master, controller 36, which conventionally provides an output signal 36a to another conventional summer 54 for combination with the neutron flux signal from the monitor 26a provided by a conventional flux controller 56 to generate the required flow demand signal 38a. The conventional turbine control system 34 also includes a conventional control valve 58 operatively joined between the pressure vessel 12 and the steam turbine 20 for conventionally controlling the flow of the steam 18 therethrough, and also includes a conventional speed monitor 26f for providing an additional speed feedback signal to a conventional pressure regulated turbine controller 60. The turbine controller 60 has conventional input signals such as a pressure demand signal 38b conventionally provided thereto.

The RCS system 30 further includes a plurality of conventional control rod drives 64, represented schematically by the single control rod drive 64 illustrated in FIG. 1, which conventionally insert and withdraw conventional control rods 66 into and out of the reactor core 14. A conventional rod controller 68 is operatively joined to the drive 64 and the control rod density monitor 26c, which monitors position of the control rods 66 within the reactor core 14 and, therefore, the collective density thereof. The rod controller 68 conventionally receives rod position demand signals 38c for controlling the density of the control rods 66 within the reactor core 14.

And, lastly in the exemplary embodiment illustrated in FIG. 1, the feedwater system 32 includes a conventional feedwater pump 70 operatively joined between the condenser of the turbine 20 and the pressure vessel 12 for pumping the condensate from the turbine 20 as feedwater into the pressure vessel 12. A conventional feedwater flow controller 72 is conventionally joined in a closed feedback loop in communication with the feedwater pump 70 and the feedwater monitor 26d which provides an indication of the feedwater flowrate $MP_5$ to the controller 72, with the controller 72 also conventionally receiving a signal for the water level within the pressure vessel 12. A feedwater flowrate demand signal 38d is conventionally provided to the controller 72.

The structures and functions of the control systems 28, 30, 32, and 34 are conventional for conventionally controlling operation of the reactor 10. Of course, additional conventional systems also exist and operate similarly to those already described in conventional closed loop operation.

In the event of an abnormal operation or condition of the reactor 10, the plant operator is required to analyze the condition and determine what mitigating action is required, which is manually effected by the operator from the control room. For example, a severe abnormal event such as a loss of coolant accident (LOCA) typically requires shut down of the reactor 10 known as a reactor trip or scram. In order to automatically monitor operation of the reactor 10 and provide automatic reactor trip, a conventional nuclear system protection system (NSPS) 74 is provided. The NSPS 74 is an independent system which conventionally receives signals from selected ones of the several monitors 26 and, upon sensing an abnormal condition, initiates action to prevent an unsafe or potentially unsafe condition. The NSPS 74 may effect a reactor trip and shut down the reactor 10 when certain limits of the monitoring parameters MP are exceeded. The NSPS 74 may also effect isolation of the pressure vessel 12 and all connections of the primary pressure boundary that penetrate the containment barrier. And, the NSPS 74 may actuate conventional engineered safety feature systems such as core cooling and residual heat removal for protecting the reactor 10. However, the NSPS 74 is able only to monitor operation of the reactor 10 and initiate these predetermined actions upon sensing the required abnormal conditions. The NSPS 74 is not able to determine the cause of the abnormal condition, which cause must be conventionally determined by the operator based on the experience and knowledge of the operator to evaluate any abnormal conditions observed. The NSPS 74 is also not able to provide any mitigation measures to prevent a reactor trip from occurring.

Figure 2:
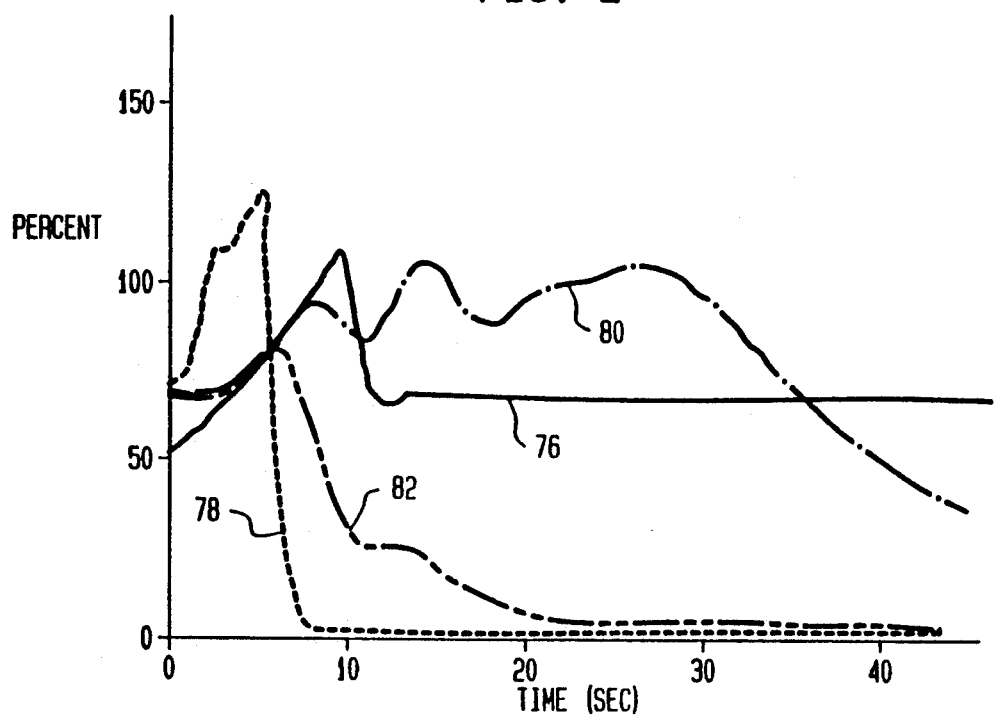
FIG. 2 is a graph plotting exemplary monitoring parameters, based on percent of rated value versus time, for the reactor illustrated in FIG. 1.

For example, illustrated in FIG. 2 is a graph plotting time in seconds on the abscissa and percent of rated value on the ordinate. Shown in solid line designated 76 is a core flowrate ($MP_2$) curve provided by the monitor 26b; shown in dashed line 78 is a neutron flux ($MP_1$) curve provided by the monitor 26a; shown in dash-dot line 80 is a feedwater flowrate ($MP_5$) curve provided by the monitor 26d; and shown in dash-double dot line 82 is steam flowrate from the vessel 12 to the turbine 20 provided by a conventional monitor (not shown). At time zero in the graph, an abnormal transient event begins which causes a corresponding change in the several monitoring parameters illustrated in FIG. 2 as well as in other conventional monitoring parameters not shown in this example. Confronted with the changing curves illustrated in FIG. 2, including the many more not shown therein, an operator would attempt to determine the cause of the abnormality based on the experience and knowledge of the operator, and then attempt to mitigate the problem. Since various types of abnormalities may occur in the operation of the relatively complex reactor 10, detecting the abnormality and then attempting to mitigate the abnormality within a relative time period compatible with human reaction capability may be relatively easy to relatively difficult depending on the abnormality and the operator's ability.

In accordance with the present invention, the CAMSYS 24 is provided for automatically identifying abnormal and normal behavior of the monitoring parameters MP; automatically determining the cause of the abnormal behavior of the monitoring parameters MP; and then at least providing a warning to the operator in the control room which identifies the likely cause.

Figure 3:
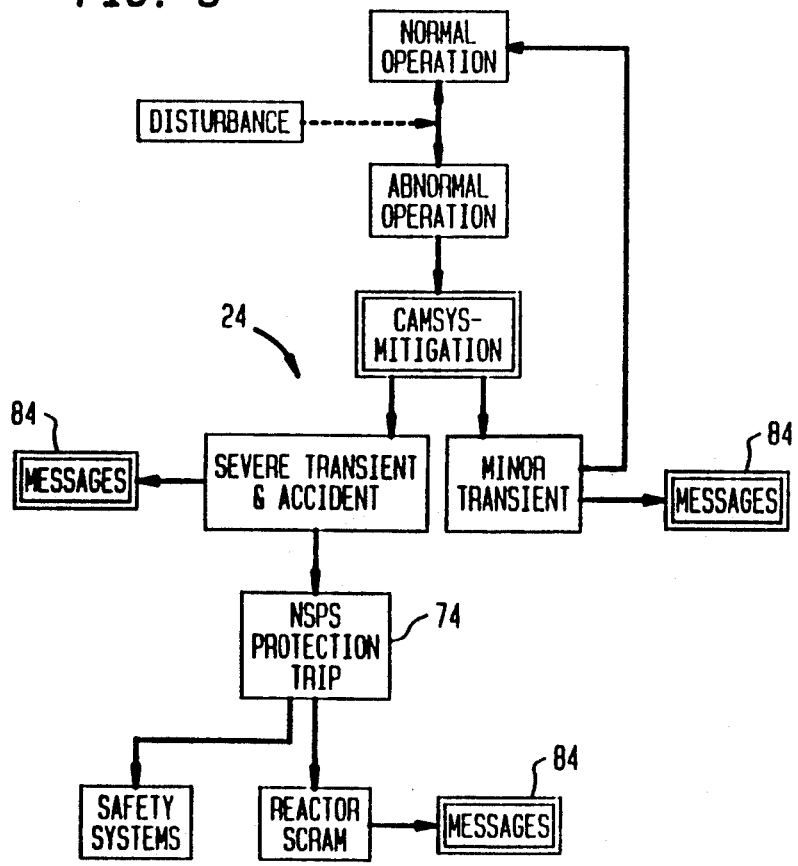
FIG. 3 is a flow chart representation of the CAMSYS used in combination with the reactor 10 illustrated in FIG. 1.

The overall relationship of the CAMSYS 24 to plant operation is illustrated in FIG. 3. When normal plant operation is disturbed by an external disturbance, such as an operator error or a component malfunction, the plant then enters an abnormal status. The disturbance may effect a minor transient condition in the reactor which may be stabilized or corrected by the conventional control systems as would typically occur during normal operation of the plant. The disturbance may effect a severe transient or accident event which will activate the NSPS 74 to effect reactor scram. Accordingly, a primary function of the CAMSYS 24 is to automatically detect the abnormal status early in the transient event and provide a warning to the plant operator through a conventional monitor 84, for example located in the plant control room. The warning will preferably indicate the likely cause of the abnormal event which preferably can also be automatically mitigated by the CAMSYS 24 for reducing the consequences resulting from the abnormal condition. The monitoring and mitigation control functions of the CAMSYS 24 are preferably totally independent from the NSPS 74 so that the safety operation of the NSPS 74 is not affected by the CAMSYS 24 and will operate as intended. Safe plant scram operation is always available if the severe transient or accident event cannot be mitigated either manually by the plant operator or automatically by the CAMSYS 24.

The CAMSYS 24 illustrated in FIG. 1 preferably includes a CAMSYS computer 24a which may be a conventional programmable microprocessor conventionally containing the required database stored in memory, and monitoring and control software algorithms in accordance with the present invention. The signals from the monitors 26 are provided directly therefrom to the CAMSYS computer 24a in parallel with the several control systems 28, 30, 32, 34 and the NSPS 74 as shown by the broken lines indicating the electrical connections therebetween.

Figure 4:
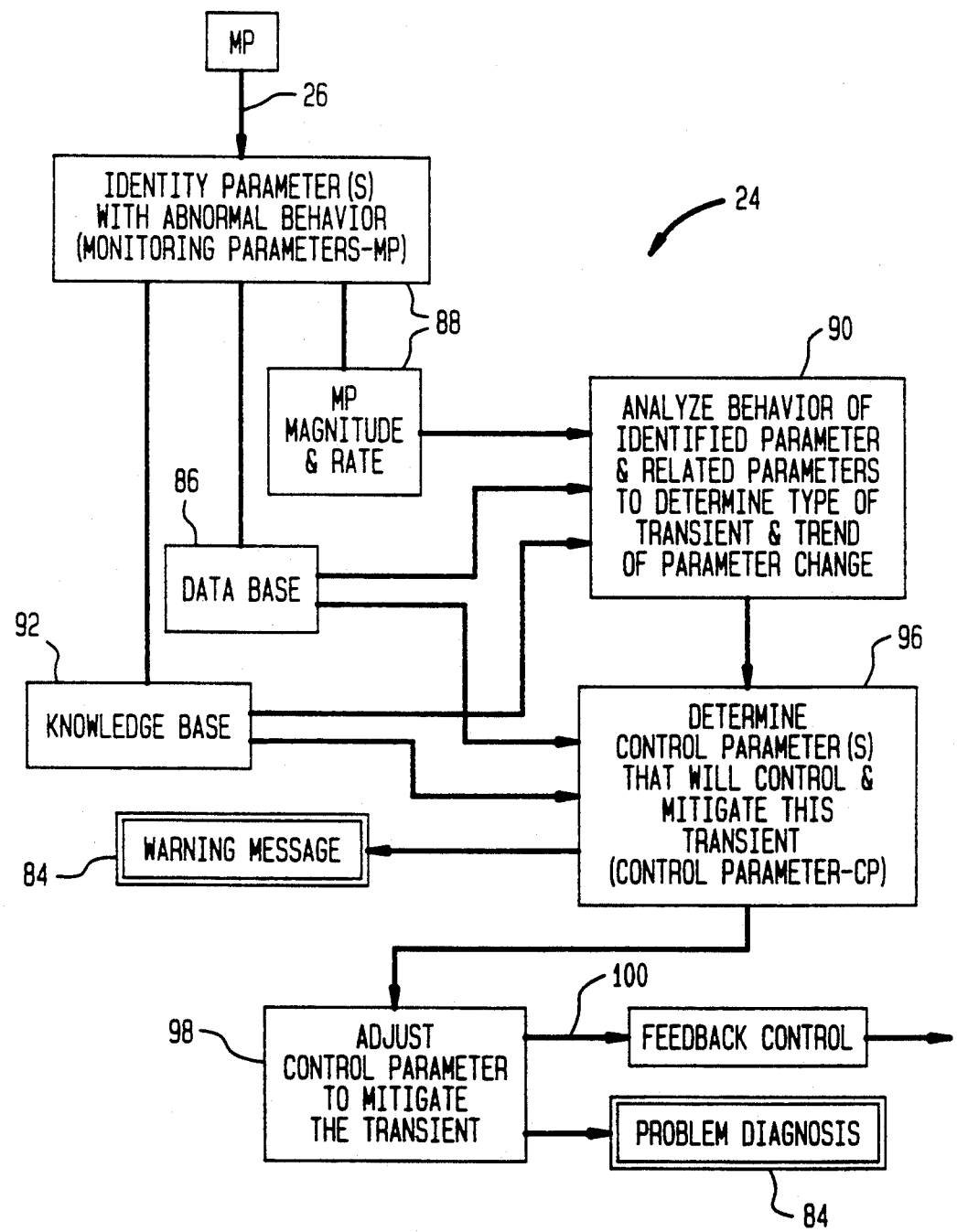
FIG. 4 is a flow chart of the basic logic processing within the CAMSYS illustrated in FIGS. 1 and 3.

The basic logic processing flow chart for the CAMSYS 24 is illustrated in FIG. 4 which receives the input signals of the several monitoring parameters MPs from the respective monitors 26, such as the exemplary signals represented by the curves of FIG. 2. Since many of the monitoring parameters are interrelated by conventional reactor physics and thermal hydraulic principles, a single abnormal event will effect transient operation in many of the monitoring parameters. Accordingly, the CAMSYS 24 is a knowledge based system containing predetermined artificial intelligence rules selected for identifying abnormal and normal behavior of the monitoring parameters, and from the abnormal monitoring parameter determining the cause of the abnormal behavior.

For example, an operator examining the monitoring parameter curves illustrated in FIG. 2 would use learned experience and knowledge in an attempt to analyze the behavior and predict the cause thereof. In FIG. 2, an abnormal condition occurs at time zero with all of the exemplary monitoring parameters increasing at various rates. Of course, in normal transient events such as those following a conventional demand for power increase, the monitoring parameters also increase, or decrease as the case may be, based on normal behavior thereof which adds to the difficulty in predicting abnormal over normal behavior. In FIG. 2, an unidentified abnormal cause leads to a rapid increase in neutron flux ($MP_1$) as shown by the curve 78, which upon reaching a predetermined setpoint of about 120% of rated value effects a protective reactor trip or scram by the NSPS 74 for shutting down the reactor 10, which occurs at about 7 seconds. Shortly thereafter the steam flowrate decreases to about 0% as shown by curve 82, and the core flowrate $MP_2$ and feedwater flowrate $MP_5$ as represented by the curves 76 and 80 behave in a normal fashion following a reactor trip.

The conventional NSPS 74 conventionally monitors and protects operation of the reactor 10 using the several monitors 26 and conventionally senses abnormal behavior thereof which may include a particular monitoring parameter exceeding a predetermined magnitude limit or setpoint or a predetermined rate of change of that magnitude as represented by a corresponding limit or setpoint. Depending upon the severity of the abnormal behavior, the NSPS 74 effects reactor scram, isolation, and/or the safety systems. However, the NSPS 74 does not include the capability to identify the cause of the abnormal behavior or prevent reactor trip.

Accordingly, the CAMSYS 24 illustrated in FIG. 4 preferably includes a conventional database 86 containing predetermined setpoint or limit values for the monitoring parameters MPs such as those used in the NSPS 74, which include magnitude and rate of change setpoints for differentiating between normal and abnormal behavior of the several monitoring parameters MPs being monitored. The setpoints in the database 86 are more stringent than those in the NSPS 74 to allow for earlier action. The CAMSYS 24 further includes conventional means 88 for identifying abnormal and normal behavior of the monitoring parameters based on the database 86. Analyzing the monitoring parameters MP and comparing them to predetermined databases containing magnitude and rate of change setpoints is conventional. In the preferred embodiment, the General Electric Transient Monitor (GETRAM) disclosed in U.S. Pat. No. 4,678,622—W. S. Rowe et al, incorporated herein by reference, may be used for identifying abnormal transient rates of change such as the excessive increase in neutron flux $MP_1$ shown in the curve 78 of FIG 2 immediately following the initiation of the abnormal event. In the example illustrated in FIG. 2, the identifying means 88 shown in FIG. 4 uses the predetermined setpoints contained in the database 86 to examine each of the monitored parameters MPs to identify and validate those that affect performance of the reactor core 14 and which indicate abnormal behavior. Each of the monitoring parameters MPs is examined for abnormal behavior. For example, if one of the MPs has an increased rate that is higher than a certain setpoint rate in the database 86, then this MP indicates an abnormal increase relative to normal plant operation.

In the FIG. 2 example, the identifying means 88 identify that the core flowrate $MP_2$, neutron flux $MP_1$, feedwater flowrate $MP_5$, and steam flowrate among others are changing and that the neutron flux $MP_1$ shown in curve 78 is increasing at an abnormal, excessive rate.

As shown in FIG. 4, the CAMSYS 24 further includes means 90 for automatically determining cause of the abnormal behavior of the monitoring parameters MPs without direct human input by the plant operator, for example. The cause determining means 90 include predetermined artificial intelligence rules, e.g. software algorithms, associated with each of the monitoring parameters MPs for analyzing and determining the cause of the abnormal behavior based on performance of preselected ones of the monitoring parameters MPs using the database 86 and a predetermined knowledge base 92.

More specifically, once the abnormally behaving monitoring parameters are identified in the first task by the identifying means 88, the identified abnormal parameter, or primary monitoring parameter, is further analyzed in a second task by the determining means 90 along with the most closely related monitoring parameters, or secondary monitoring, parameters, to determine the characteristics of the transient including type of transient and trend of parameter change for identifying the cause of the abnormal behavior. This is accomplished by using the predetermined knowledge base 92 which is implemented in the predetermined artificial intelligence rules associated with each of the monitoring parameters.

Since an abnormal condition will typically be reflected in changes of several of the monitoring parameters, it is necessary to evaluate those related parameters to discern abnormal from normal behavior in order to identify cause. The knowledge base 92, therefore, preferably includes at least one, and in the preferred embodiment all three, of (1) predetermined analytical transient and accident operating performance of the reactor 10 which are conventionally obtained; (2) actual operating records of transient and accident operating performance of the reactor 10 which are also conventionally obtained; and (3) the interrelationship of the primary and secondary monitoring parameters based on predetermined reactor physics and thermal hydraulic principles which are also conventionally obtained. For example, analytical and empirical data are conventionally known which indicate core performance based on changes in core flow and control rod density changes, for example, or based on accidents such as the LOCA. And, core response to core flow changes is reflected in four interrelated variables, i.e., core void fraction, Doppler coefficient, core inlet enthalpy change, and Xenon concentration change, as is conventionally known. In this way, the secondary monitoring parameters may be preselected for each primary monitoring parameter to determine the abnormal behavior cause based thereon.

Figure 5:
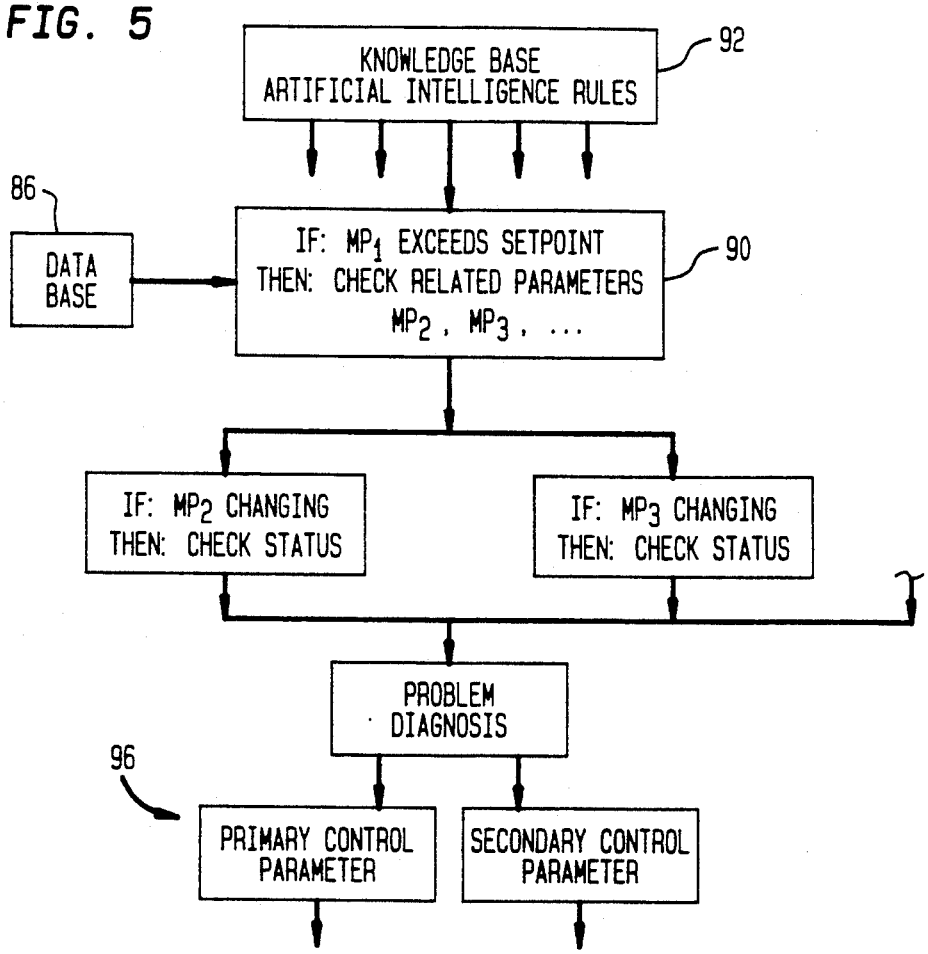
FIG. 5 is a flow chart representing exemplary artificial intelligence rules based on the knowledge base illustrated in FIG. 4.

One example of the required artificial intelligence rules for the FIG. 2 example include the following rules represented schematically in FIG. 5:

(1) If the primary monitoring parameter, e.g. $MP_1$, such as neutron flux (curve 78) exceeds a predetermined setpoint such as an excessive rate increase as identified by GETRAM, then check related, secondary parameters $MP_2$, $MP_3$, etc., such as core flowrate (curve 76)

and control rod density change rates (based on the positions of the several control rods 66).

(2) If the secondary monitoring parameter $MP_2$, such as core flowrate (curve 76) is changing, or increasing for example, then check status of its respective control system, e.g. the RFCS 28, to determine whether it is demanding such change or not.

(3) If the secondary monitoring parameter $MP_3$ is changing, for example control rod density is changing, then check for status of its control system, e.g. RCS system 30 for automatic or manual operation thereof.

(4) Diagnose abnormal problem based on predetermined interrelationship of the primary monitoring parameter $MP_1$ and the secondary monitoring parameters $MP_2$, $MP_3$, etc., for example, if the core flowrate increases at an excessive rate, and if there is no demand for such increase, and if there is no control rod density change, then there is a control problem in the RFCS 28.

Accordingly, the cause of the abnormal behavior of the example illustrated in FIG. 2 is determined to be loss of control of the core flowrate (curve 76) which is increasing substantially linearly. For example, the flow controller 46 illustrated in FIG. 1 may fail causing the control valve 42 to abnormally open and increase the core flowrate through the reactor core 14. As the core flowrate increases (curve 76), the neutron flux increases rapidly (curve 78), and unless mitigating action is effected, the NSPS 74 will effect a reactor trip as shown in FIG. 2 at about 7 seconds from initiation of the failure of the flow controller 46.

The CAMSYS 24 can, well within the time before reactor trip, identify the problem, such as the failure of the flow controller 46, and provide a warning through the monitor 84 to the plant operator in the control room which identifies the cause of the abnormal behavior. For example, the warning displayed by the monitor 84 may simply state "CORE FLOW ABNORMAL INCREASE."

The operator may then effect mitigating action, manually without automatic operation from CAMSYS 24, for example, by conventionally placing the flow controller 46 in manual, and sending a suitable override signal 38e as shown in FIG. 1 to a conventional manual override controller 94 operatively joined to the actuator 44, and by conventionally actuating the RCS 30 (signal 38c) to insert selected control rods 66.

In this exemplary embodiment, the primary monitoring parameter is neutron flux $MP_1$ and the secondary monitoring parameters include core flowrate $MP_2$ and control rod density change rate $MP_3$, and may also include feedwater flowrate $MP_5$ and reactor pressure $MP_6$ all conventionally known to be interrelated. And, the artificial intelligence rules identify the recirculation flow control system problem as a likely cause of the abnormal behavior of the neutron flux exceeding a given setpoint wherein the core flowrate also exceeds a given setpoint without normal demand therefor, and the control rod density change rate is substantially unchanged.

Of course, this is but one relatively simple example of the artificial intelligence rules contained in the knowledge base 92 of the CAMSYS computer 24a. As shown in FIG. 5, these rules are but one branch of the many branches which may be created for evaluating each desired monitoring parameter MP and interrelated secondary monitoring parameters. The artificial intelligence rules may be as sophisticated as desirable based on the degree of sophistication to conventionally analyze abnormal symptoms in advance and provide suitable artificial intelligence rules for allowing the causes of the abnormal symptoms to be analyzed and identified with suitable accuracy. The rules may be as simple as the exemplary rules presented above or may be more complex based upon conventionally known interrelationships of parameters trends as defined by reactor physics and thermal-hydraulic principles as well as on analytical and empirical data reflecting plant transient and accident events.

The CAMSYS computer 24a may further include as shown in FIG. 4 additional means 96 for determining at least one control parameter CP to control or mitigate the monitoring parameter abnormal behavior either displayed through the monitor 84 to the operator for manual correction, or for automatic mitigation effected by the CAMSYS 24 itself. Exemplary conventionally known control parameters CPs include core flowrate and control rod position, which are the primary parameters for controlling operation of a boiling water reactor, with additional control parameters including feedwater flowrate, load demand, and others including several of the monitoring parameters MPs themselves. There is an overlap between the monitoring parameters MPs and the control parameters CPs which is conventionally known, with some parameters providing both monitoring information and control functions. As shown in FIGS. 4 and 5, the control parameter determining means 96 use suitable artificial intelligence rules from the knowledge base 92 and data from the database 86 to determine which control parameters CPs may be used to mitigate the abnormal transient event.

For example, once it is determined that the flow controller 46 has failed and, therefore, control over the core flowrate has been lost, the core flowrate becomes the primary control parameter $CP_1$ for controlling the excessive increase in neutron flux. One or more secondary control parameters may also be selected which also assist in controlling the neutron flux such as control rod position which effects control rod density $CP_2$ in the reactor core 14 and therefore neutron flux. The secondary control parameters are preselected for each predetermined abnormal symptom and are contained in the knowledge base 92, again based upon conventionally known interrelationships of the parameters based on reactor physics and thermal hydraulic principles and analytical and empirical plant transient and accident events. For a predetermined abnormal symptom, primary and secondary control parameters may be specified in the knowledge base 92 for use as required when confronting actual abnormal symptoms.

For the example presented in FIG. 2 and discussed above, the warning message displayed in the monitor 84 may identity the failure of the flow controller 46 and suggest mitigation control by manually adjusting the core flowrate $CP_1$, i.e., by decreasing the flowrate, or by inserting the control rods 66 to increase rod density $CP_2$, or both, for preventing the neutron flux level from exceeding the setpoint leading to reactor scram.

As described above, the mitigating action may be taken manually by the operator from the plant control room, or, the CAMSYS 24 may further include means 98 for automatically adjusting the primary or secondary control parameters CPs, or both, to mitigate the monitoring parameter abnormal behavior as shown schematically in FIG. 4. The CAMSYS computer 24a illustrated in FIG. 1 may simply include additional conventional control commands, e.g. in a dedicated CAMSYS controller, which will forward suitable mitigating signal or signals, e.g. 100 a-e, to the appropriate control systems, e.g. 28, 30, 32, 34.

Once the cause of the abnormal behavior is identified and a suitable control parameter CP for mitigating the abnormal behavior is determined, the control parameter CP may be automatically adjusted by the means 98 to provide a suitable corrective or mitigating signal to mitigate the abnormal behavior. For the example presented above, the flow controller 46 shown in FIG. 1 may be bypassed by automatically providing the mitigating signal from the CAMSYS computer 24a as an override signal 100e, comparable to override signal 38e, directly to the manual override controller 94 to suitably close the abnormally open control valve 42 to reverse the excessive core flowrate and, thereby, reverse the abnormal increase in neutron flux. At the same time, another mitigating signal 100c, comparable to demand signal 38c, may be automatically provided by the means 98 within the CAMSYS computer 24a to the rod controller 68 to further insert selected control rods 66 for also reducing the neutron flux to a more normal level. And, yet another mitigating signal 100d, comparable to demand signal 38d, may be provided to flow controller 72 to suitably adjust feedwater flow.

The CAMSYS computer 24a may also provide a mitigating signal 100a directly to the summer 48 to automatically adjust recirculation flow as required during abnormal events when the flow controller 46 is functioning properly and does not require override.

As shown in FIG. 4, the schematic feedback control joined to a respective output line 100 which carries the respective mitigating signal is any suitable feedback control system of the reactor 10 which is selected for mitigating the abnormal behavior. The monitor 84 may then also display the problem diagnosis and the corrective action automatically effected. The adjusting means 98 may provide a suitable mitigating signal to the respective feedback control systems of the reactor 10 for conventional closed loop feedback operation. The degree of control adjustment depends on the severity of the abnormal transient. This can be achieved through conventional logic that responds to substantially instantaneous and infinitesimal changes of the MP signal. Preferably, the adjusting means 98 within the CAMSYS computer 24a includes conventional "fuzzy" logic for mitigating the abnormal transient event. Fuzzy logic may be useful to improve mitigation performance where the interrelationship between the several parameters is complex and in view of the prolonged conventional time lags and oscillatory responses between demand changes in the control parameters and the response as observed by the monitoring parameters in conventional continuous control logic.

Figure 6:
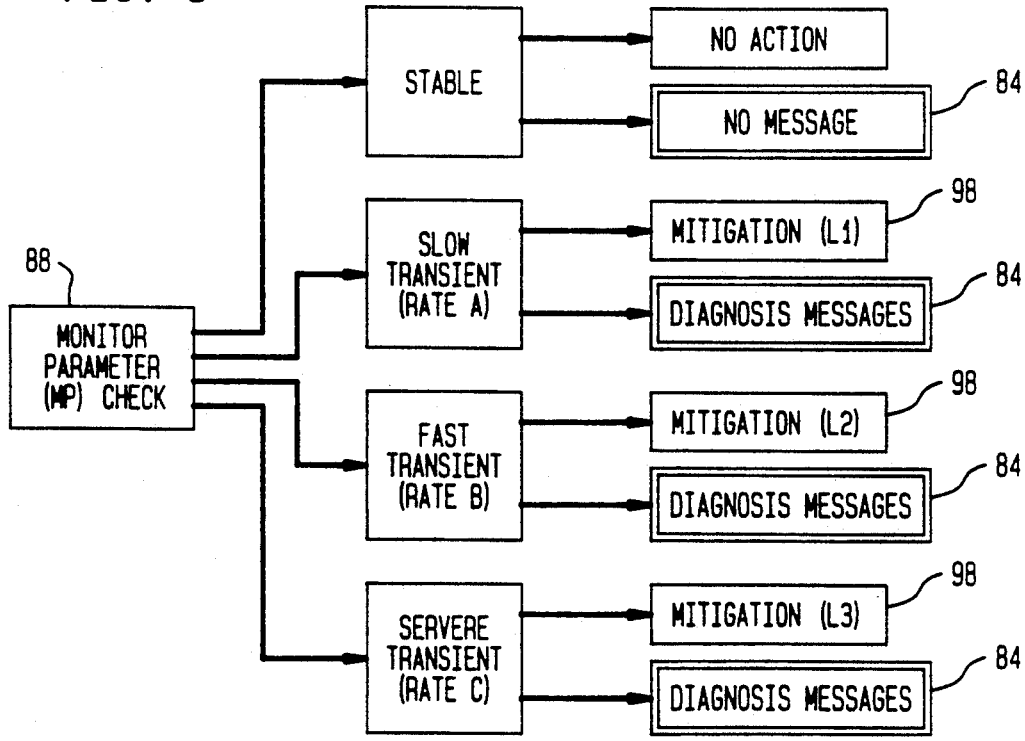
FIG. 6 is a flow chart representation for determining the degree of transient rate of the abnormal monitoring parameter being identified in FIG. 4.

Since transient abnormal events may vary in rate from relatively slow to relatively fast, the identifying means 88 illustrated in FIG. 4 may be conventionally selected to discern the different rates as illustrated schematically in FIG. 6. The rate of change of the monitoring parameter MP may be conventionally determined, for example by using the GETRAM, which determines the rate of the abnormal behavior including a first rate A which may be classified as a slow transient, a second rate B which may be classified as a fast transient relative to the slow transient, and a third rate C which may be classified as a very fast or severe transient which is in turn faster than the fast transient of rate B. The three rates A, B, and C are preferably predetermined ranges of rates with the range below the slow transient rate A being defined as stable operation wherein no mitigating action is required or taken and no message is displayed from the monitor 84. If any one monitoring parameter MP is greater than the stable rate of change, it will fall into one of the three rates A, B, and C which will determine the respective levels L1, L2, and L3 of mitigation required, either displayed in the monitor 84 to be effected manually by the operator in the control room or effected automatically by the adjusting means 98. As shown additionally in FIG. 3, the slow and fast transients may be considered minor transients which can be mitigated without reactor scram, whereas the severe transient, including an accident event, will require actuation of the NSPS 74 to scram the reactor 10 and isolate the reactor and effect the safety systems as conventionally required.

Accordingly, the adjusting means 98 may include suitable algorithms indicating the respective levels L1, L2, and L3 of mitigation required based on the severity of the observed abnormal transient. Again with respect to the core flowrate example presented above, if the increase in core flowrate is relatively slow, the mitigation level L1 may merely require manual control of the actuator 44 by the manual override controller 94 in response to the CAMSYS computer 24a, or the control rods 66 may be additionally inserted into the core 14 as directed by the CAMSYS computer 24a. For automatic control by the CAMSYS computer 24a in level L1, mitigation is effected using relatively small corrections. If the core flowrate abnormality is within the fast transient range, the second mitigation level L2 may require at least both of these corrective actions with medium sized corrections. And, if the core flowrate increase is within the severe transient range, with the neutron flux level increasing at a severe rate, the third mitigation level L3 is effected with the largest sized corrections. The NSPS 74 may possibly effect reactor scram if the mitigation is not effective to ameliorate the abnormal behavior quickly enough, but its independent operation is nevertheless maintained.

For example, the NSPS 74 is actuated when the neutron flux curve 78 of FIG. 2 reaches a predetermined maximum limit such as the 120% illustrated in FIG. 2. However, the CAMSYS 24 may automatically mitigate the cause of the neutron flux abnormal increase prior to it reaching the 120% limit, thus preventing reactor scram. Since the CAMSYS 24 is completely independent of the operation of the NSPS 74, an improved, and now intelligent, overall system is obtained with the NSPS 74 retaining its ability to effect reactor scram.

Since the CAMSYS 24 is microprocessor based using the computer 24a, all required logic therein may be conventionally programmed using conventional software algorithms. The degree of sophistication and complexity of the algorithms may vary from relatively simple to relatively complex based on the experience and knowledge base intended to be utilized. The CAMSYS 24 preferably includes evaluation of the magnitude and rates of change of the several monitoring parameters MPs. It may also further include second order changes in the monitoring parameters. Although the exemplary monitoring parameters MPs are those specifically associated with performance of the reactor core 14 itself, additional monitoring parameters may be utilized for monitoring other plant functions indirectly associated with performance of the core 14. Conventional principles of neural networks which may be combined with fuzzy logic technology may be also utilized for more extensive monitoring and control of plant abnormal operating status.

Although the CAMSYS 24 has been described with respect to a conventional boiling water reactor (BWR) it may also be used for other types of reactors such as a pressurized water reactor (PWR). The database, knowledge base, and algorithms will, of course, be suitably modified to fit the operating principles of the PWR.

The CAMSYS 24 is a flexible system providing the ability to monitor selected monitoring parameters which reflect core performance, for example, to determine abnormal operation thereof. And, most significantly, the CAMSYS 24 utilizes artificial intelligence rules based on performance interrelationships between monitored parameters using conventional and well known principles including reactor physics and thermal-hydraulics, and analytical and empirical data representative of transient and accident events to determine the cause or causes of the abnormal behavior. The predicted cause is provided to the operator for his evaluation and action as required, or may automatically mitigated by the CAMSYS 24 as described above. The CAMSYS 24, therefore, utilizes the predetermined knowledge base 92 to at least assist the operator in identifying abnormal transient causes for improving control of the reactor 10.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A core automated monitoring system (CAMSYS) comprising:
    a nuclear reactor including a reactor pressure vessel containing a nuclear reactor core for boiling water in said vessel to generate steam;
    a plurality of monitors for monitoring operation of said nuclear reactor, each monitor providing a signal for a respective monitoring parameter; and
    a CAMSYS computer including:
        a database containing predetermined setpoints for said monitoring parameters;
        means for identifying abnormal and normal behavior of said monitoring parameters based on said database;
        means for determining cause of abnormal behavior of said monitoring parameters including predetermined artificial intelligence rules associated with each, primary one, of said monitoring parameters for determining said abnormal behavior cause based on performance of preselected related, secondary, ones of said monitoring parameters; and
        means for determining a control parameter to mitigate said monitoring parameter abnormal behavior.

2. A CAMSYS according to claim 1 further comprising means for providing a warning identifying said monitoring parameter abnormal behavior cause.

3. A CAMSYS according to claim 2 wherein said secondary monitoring parameters are preselected for each primary monitoring parameter to determine said abnormal behavior cause based on all three of:
    predetermined analytical transient and accident operating performance of said reactor;
    actual operating records of transient and accident operating performance of said reactor; and
    interrelationship of said primary and secondary monitoring parameters based on predetermined reactor physics and thermal hydraulic principles.

4. A CAMSYS according to claim 2 wherein said secondary monitoring parameters are preselected for each primary monitoring parameter to determine said abnormal behavior cause based on at least one of:
    predetermined analytical transient and accident operating performance of said reactor;
    actual operating records of transient and accident operating performance of said reactor; and
    interrelationship of said primary and secondary monitoring parameters based on predetermined reactor physics and thermal hydraulic principles.

5. A CAMSYS according to claim 4 wherein said primary monitoring parameter is neutron flux and said secondary monitoring parameters include core flowrate and control rod density change rate; and
    said artificial intelligence rules identify a recirculation flow control system problem as a cause of abnormal behavior of said neutron flux exceeding a given setpoint wherein said core flowrate also exceeds a given setpoint without normal demand therefor and said control rod density change rage is substantially zero.

6. A CAMSYS according to claim 4 wherein said CAMSYS computer further comprises
    means for adjusting said control parameter to mitigate said monitoring parameter abnormal behavior.

7. A CAMSYS according to claim 6 further including a nuclear system protection system (NSPS) operatively joined to said monitors and effective to cause reactor trip and operation of reactor safety systems; and
    wherein said behavior identifying means determine rate of said abnormal behavior including a slow transient, a fast transient relative to said slow transient, and a severe transient faster than said fast transient, with said slow, fast, and severe transients effecting different levels of mitigation.

8. For a nuclear reactor including a reactor pressure vessel containing a nuclear reactor for boiling water in said vessel to generate steam, and a plurality of monitors for monitoring operation of said nuclear reactor, each monitor providing a signal for a respective monitoring parameter, a method of operation comprising:
    providing a database containing predetermined setpoints for said monitoring parameters;
    identifying abnormal and normal behavior of said monitoring parameters based on said database;
    automatically determining cause of abnormal behavior of said monitoring parameters in a computer based on said database and predetermined artificial intelligence rules associated with each, primary one, of said monitoring parameters for determining said abnormal behavior cause based on performance of preselected related, secondary, ones of said monitoring parameters; and
    automatically determining a control parameter to mitigate said monitoring parameter abnormal behavior.

9. A method according to claim 8 further comprising adjusting said control parameter to mitigate said monitoring parameter abnormal behavior.

10. A method according to claim 9 further comprising providing a warning identifying said monitoring parameter abnormal behavior cause.

11. A method according to claim 10 wherein said primary monitoring parameter is neutron flux and said secondary monitoring parameters include core flowrate and control rod density change rate; and said artificial intelligence rules identify a recirculation flow control system problem as a cause of abnormal behavior of said neutron flux exceeding a given setpoint wherein said core flowrate also exceeds a given setpoint without normal demand therefor and said control rod density change rage is substantially zero.

* * * * *